US006871408B2

United States Patent
Malard et al.

(10) Patent No.: US 6,871,408 B2
(45) Date of Patent: Mar. 29, 2005

(54) MANUAL LEVELING ROTATING LASER WITH SWIVEL HEAD

(75) Inventors: Fabrice J. Malard, Pleasant Prairie, WI (US); John H. Loudenslager, Phoenix, AZ (US); Albert Gamal, Le Mesnil le Roi (FR)

(73) Assignee: Irwin Industrial Tool Company, Freeport, IL (US)

( * ) Notice: Subject to any disclaimer, the term of this patent is extended or adjusted under 35 U.S.C. 154(b) by 0 days.

(21) Appl. No.: 10/376,650

(22) Filed: Feb. 28, 2003

(65) Prior Publication Data

US 2004/0004825 A1 Jan. 8, 2004

(Under 37 CFR 1.47)

Related U.S. Application Data

(60) Provisional application No. 60/360,945, filed on Mar. 1, 2002.

(51) Int. Cl.[7] ................................................ G01C 15/00
(52) U.S. Cl. ............................. 33/286; 33/291; 33/281; 33/DIG. 21
(58) Field of Search .................. 33/227, 291, 281–283, 33/285–286, DIG. 21

(56) References Cited

U.S. PATENT DOCUMENTS

| | | | |
|---|---|---|---|
| 3,628,874 A | | 12/1971 | Tagnon |
| 3,635,565 A | | 1/1972 | Colson |
| 3,820,903 A | | 6/1974 | Kindl et al. |
| 3,964,824 A | | 6/1976 | Dixon |
| 4,029,415 A | * | 6/1977 | Johnson ........................ 33/294 |
| 4,031,629 A | | 6/1977 | Paluck |
| 4,035,084 A | * | 7/1977 | Ramsay ........................ 33/291 |
| 4,111,564 A | | 9/1978 | Trice, Jr. |
| 4,221,483 A | | 9/1980 | Rando |
| 4,751,782 A | | 6/1988 | Ammann |
| 4,854,704 A | | 8/1989 | Funazaki et al. |
| 4,912,851 A | | 4/1990 | Rando et al. |
| 4,988,192 A | * | 1/1991 | Knittel ................... 33/DIG. 21 |

(Continued)

OTHER PUBLICATIONS

Search Report, dated Sep. 3, 2003, for corresponding international application No. PCT/US03/06269.

*Primary Examiner*—Diego Gutierrez
*Assistant Examiner*—Yaritza Guadalupe
(74) *Attorney, Agent, or Firm*—Marshall, Gerstein & Borun LLP

(57) ABSTRACT

A self-contained laser generator uses a laser diode and a mirror to generate a laser light beam, split it into two parts, and generate perpendicular beams of laser light. One of more mirrors are useful for receiving light and splitting it into two beams. An internal motor then rotates the mirrors and one of the beams becomes a rotating laser light, useful for aligning objects in a horizontal or vertical direction. The other beam may be used to locate and orient the rotating laser line generator in a different plane.

30 Claims, 10 Drawing Sheets

U.S. PATENT DOCUMENTS

| | | | | |
|---|---|---|---|---|
| 4,993,161 A | | 2/1991 | Borkovitz | |
| 5,075,977 A | | 12/1991 | Rando | |
| 5,144,487 A | | 9/1992 | Hersey | |
| 5,159,760 A | * | 11/1992 | Spiegel et al. | 33/227 |
| 5,208,438 A | | 5/1993 | Underberg | |
| 5,243,398 A | | 9/1993 | Nielsen | |
| 5,287,365 A | | 2/1994 | Nielsen et al. | |
| 5,287,627 A | | 2/1994 | Rando | |
| 5,400,514 A | * | 3/1995 | Imbrie et al. | 33/286 |
| 5,459,932 A | | 10/1995 | Rando et al. | |
| 5,524,352 A | | 6/1996 | Rando et al. | |
| 5,533,268 A | | 7/1996 | Keightley | |
| 5,539,990 A | | 7/1996 | Le | |
| 5,552,886 A | | 9/1996 | Kitajima et al. | |
| 5,574,582 A | | 11/1996 | Takeda et al. | |
| 5,584,458 A | | 12/1996 | Rando | |
| 5,594,993 A | | 1/1997 | Tager et al. | |
| 5,610,711 A | | 3/1997 | Rando | |
| 5,617,202 A | | 4/1997 | Rando | |
| 5,619,802 A | | 4/1997 | Rando et al. | |
| 5,621,975 A | | 4/1997 | Rando | |
| 5,666,736 A | | 9/1997 | Wen | |
| 5,742,387 A | | 4/1998 | Ammann | |
| 5,754,582 A | | 5/1998 | Dong | |
| 5,819,424 A | | 10/1998 | Ohtomo et al. | |
| 5,836,081 A | | 11/1998 | Orosz, Jr. | |
| 5,864,956 A | | 2/1999 | Dong | |
| 5,872,657 A | | 2/1999 | Rando | |
| 5,907,907 A | | 6/1999 | Ohtomo et al. | |
| 5,917,587 A | | 6/1999 | Rando | |
| 5,960,551 A | * | 10/1999 | Nishi et al. | 33/292 |
| 5,983,510 A | | 11/1999 | Wu et al. | |
| 5,992,029 A | | 11/1999 | Dong | |
| 6,005,716 A | | 12/1999 | Ligtenberg et al. | |
| 6,005,719 A | | 12/1999 | Rando | |
| 6,009,630 A | | 1/2000 | Rando | |
| 6,012,229 A | | 1/2000 | Shiao | |
| 6,014,211 A | | 1/2000 | Middleton et al. | |
| 6,037,874 A | | 3/2000 | Heironimus | |
| 6,043,879 A | | 3/2000 | Dong | |
| 6,065,217 A | | 5/2000 | Dong | |
| 6,073,353 A | | 6/2000 | Ohtomo et al. | |
| 6,073,354 A | | 6/2000 | Rando | |
| 6,082,013 A | | 7/2000 | Peterhans | |
| 6,082,875 A | | 7/2000 | Kousek | |
| 6,101,728 A | | 8/2000 | Keng | |
| 6,163,969 A | | 12/2000 | Jan et al. | |
| 6,195,901 B1 | * | 3/2001 | Falb | 33/286 |
| 6,324,024 B1 | * | 11/2001 | Shirai et al. | 359/884 |
| 6,427,347 B1 | * | 8/2002 | Butler, Sr. | 33/286 |
| 6,724,471 B2 | * | 4/2004 | Feist et al. | 33/290 |
| 2002/0065462 A1 | * | 5/2002 | Brabrand et al. | 600/427 |
| 2002/0083603 A1 | * | 7/2002 | Jang | 33/281 |

* cited by examiner

MANUAL LEVELING ROTATING LASER WITH SWIVEL HEAD

RELATED APPLICATIONS

This application claims the benefit of the filing date under 35 U.S.C. § 119(e) of Provisional U.S. Patent Application Ser. No. 60/360,945, filed on Mar. 1, 2002, which is hereby incorporated by reference in its entirety.

BACKGROUND

Alignment of surfaces is a perennial problem in a variety of fields, ranging from construction to interior decorating. Alignment is necessary for walls that should be perpendicular to a floor, parallel to a floor, level with a floor, or otherwise plumb. Masonry and brick-laying practitioners are well aware of the importance of plumbed and aligned surfaces and chalk lines. A room is far more attractive when small details such as electrical outlets are aligned at the same level above the floor. A home interior decorated with pictures and other wall ornamentation makes a much better appearance when the ornamentation is aligned, especially with respect to vertical or horizontal alignment. Many mechanical and electrical alignment devices are available, and some laser devices are available. Some of these products are cumbersome, others are not as useful as they could be. Chalk lines, for instance, are sometimes undesirable for use in finished, interior areas.

Another aspect in which present laser devices are deficient is they do not easily provide both horizontal and vertical leveling. They must be re-positioned and re-oriented if a user desires to change from horizontal alignment to vertical alignment. A user may require both horizontal leveling, such as for wall hangings, drop ceilings, or electrical outlet height, and vertical leveling, such as for window and door framing. Typically, leveling laser devices must be re-oriented and trued so that upon changing orientation from horizontal to vertical, the devices will read true and plumb. What is desired is a convenient, easy-to-level laser device useful for aligning objects, and able to be quickly and accurately useful in both horizontal and vertical planes.

BRIEF SUMMARY

One embodiment of the invention is a laser line generator for generating a rotating laser light. The laser line generator comprises a housing having at least one mounting feature. The laser line generator also comprises a laser light source, at least one mirror that receives and transmits the laser light, and a motor rotating the at least one mirror, wherein the laser light is transmitted from the light source through a center of the motor to the at least one mirror. The laser line generator also comprises a controller connected to the motor for controlling a speed of the motor.

Another embodiment is a rotating laser line generator that comprises a housing and a laser light source mounted within the housing. The laser line generator also comprises at least one mirror adapted to receive light from the source and project the light in a first direction and a second direction of propagation, and also comprises a power supply and motor connected to the at least one mirror. In this embodiment, the light travels a path through a center of the motor. The laser light source, the motor and the at least one mirror are mounted pivotally within the housing.

Another embodiment is a method for projecting laser light. The method comprises providing a rotating laser line generator. The method also includes projecting laser light through a center of a motor rotating at least one mirror, and rotating the at least one mirror to project a first laser light beam onto a first surface and to project a second laser light beam perpendicular to the first light beam onto a second surface perpendicular to the first surface.

The laser generator generates a laser light beam that may be rotated 360° in a vertical or horizontal plane, for aligning objects in the plane.

DETAILED DESCRIPTION OF THE DRAWINGS AND THE PRESENTLY PREFERRED EMBODIMENTS

Figure 1:
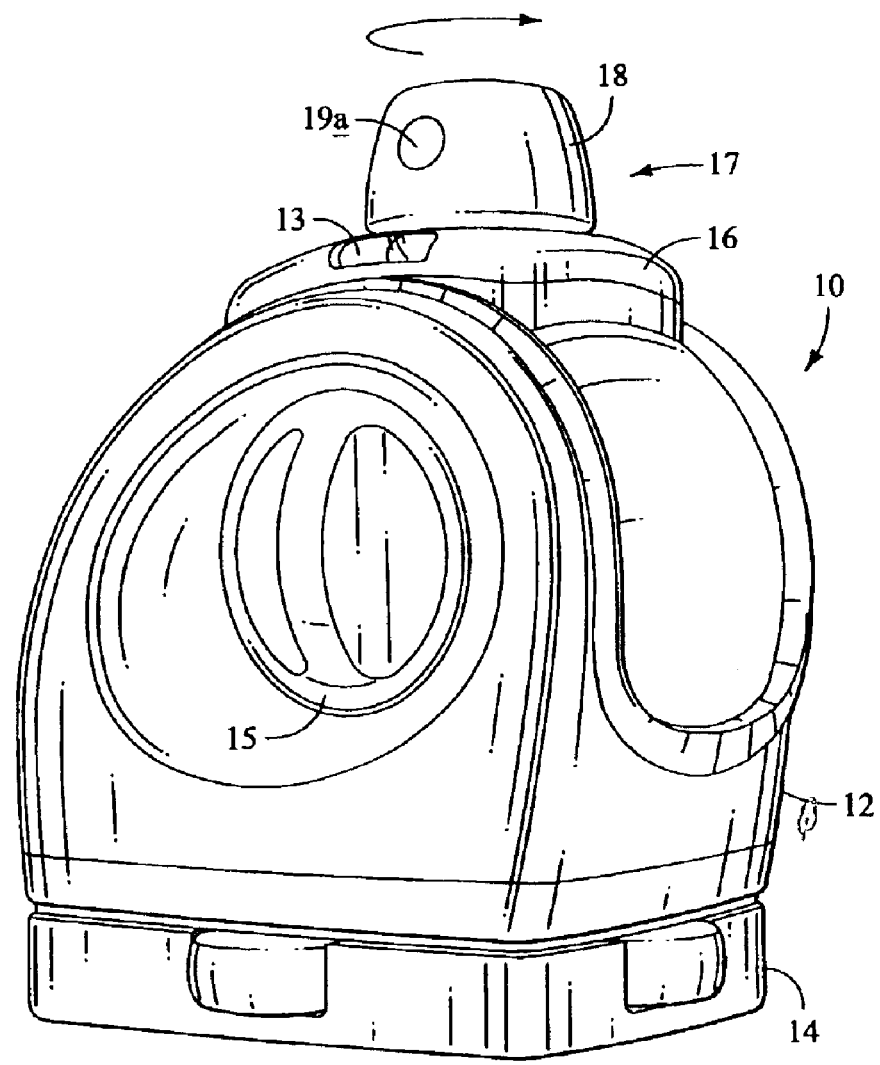
FIG. 1 is an isometric view of a rotating laser line generator in position for generating a horizontal beam of light.

The present invention is better understood by reference to the figures and description below. FIG. 1 presents an isometric view of a first embodiment of a rotating laser line generator 10. The rotating laser line generator includes a housing 12 and a base 14 mounting the housing. The generator also includes a cover 16 having at least one level indicator 13, such as a bubble level. Atop cover 16 is lens assembly 17 including lens cover 18 and lens 19a from which laser light may emerge. The rotating laser line generator 10 may be mounted on its bottom feature and used in the position shown, in which the lens and lens cover 18 rotate and generate a 360° line of light in a horizontal plane. The laser light source and lens project a beam of laser light in the shape of a dot. By rotating the lens relatively rapidly in the direction of the arrow, the dot is projected in a 360° circle around a room or other area in which the rotating laser line generator is used. Thus, it appears to the user that the generator is projecting a complete circle, depending on the speed at which the lens is rotating.

A rotating beam in a horizontal plane will enable users of the rotating laser line generator to align objects vertically in a room, such as aligning bottoms of suspended ceilings, electrical outlets, window openings, shelving, and the like. The laser line generator may be equipped with a swivel or pivot mechanism and swivel or pivot knob 15. This enables a user to pivot the working portions of the laser light generator 90°, thus also pivoting the beams 90°. The laser line generator will then generate a beam of light in a vertical plane, 90° to the horizontal plane discussed above. A rotating vertical beam will allow users to align objects horizontally, such as a window edge or a doorjamb. The ability to pivot the rotating lens minimizes set-up time for re-orienting and re-leveling the rotating laser line generator.

Figure 2:
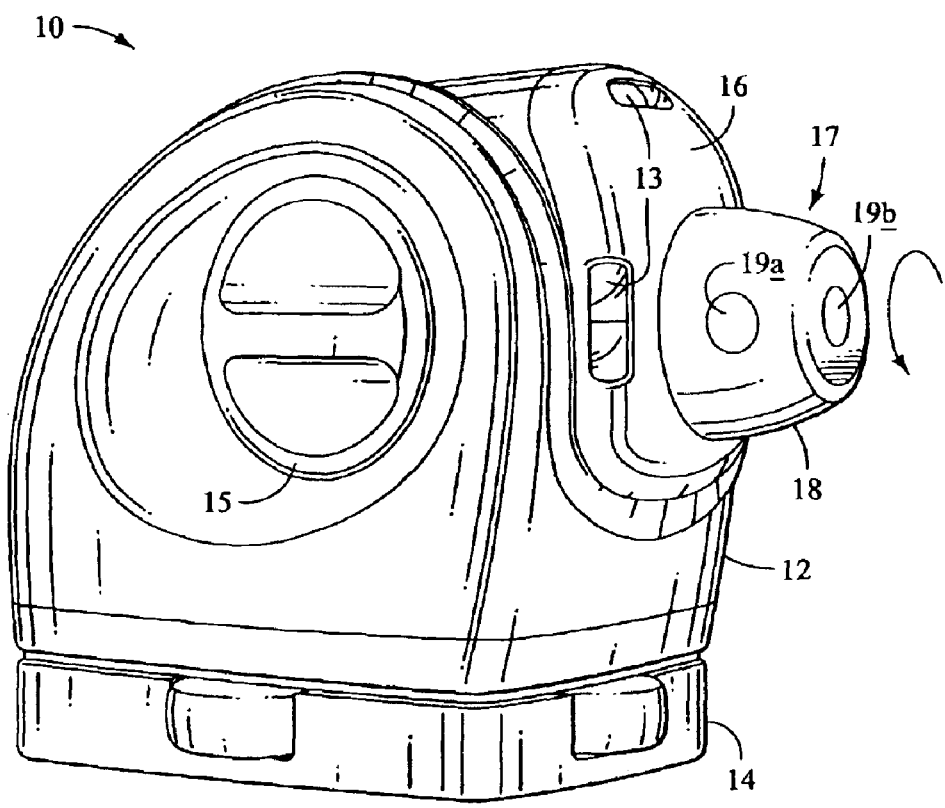
FIG. 2 is an alternate positioning of the embodiment of FIG. 1 showing the generator in position for generating a vertical beam of light.
Figure 3:
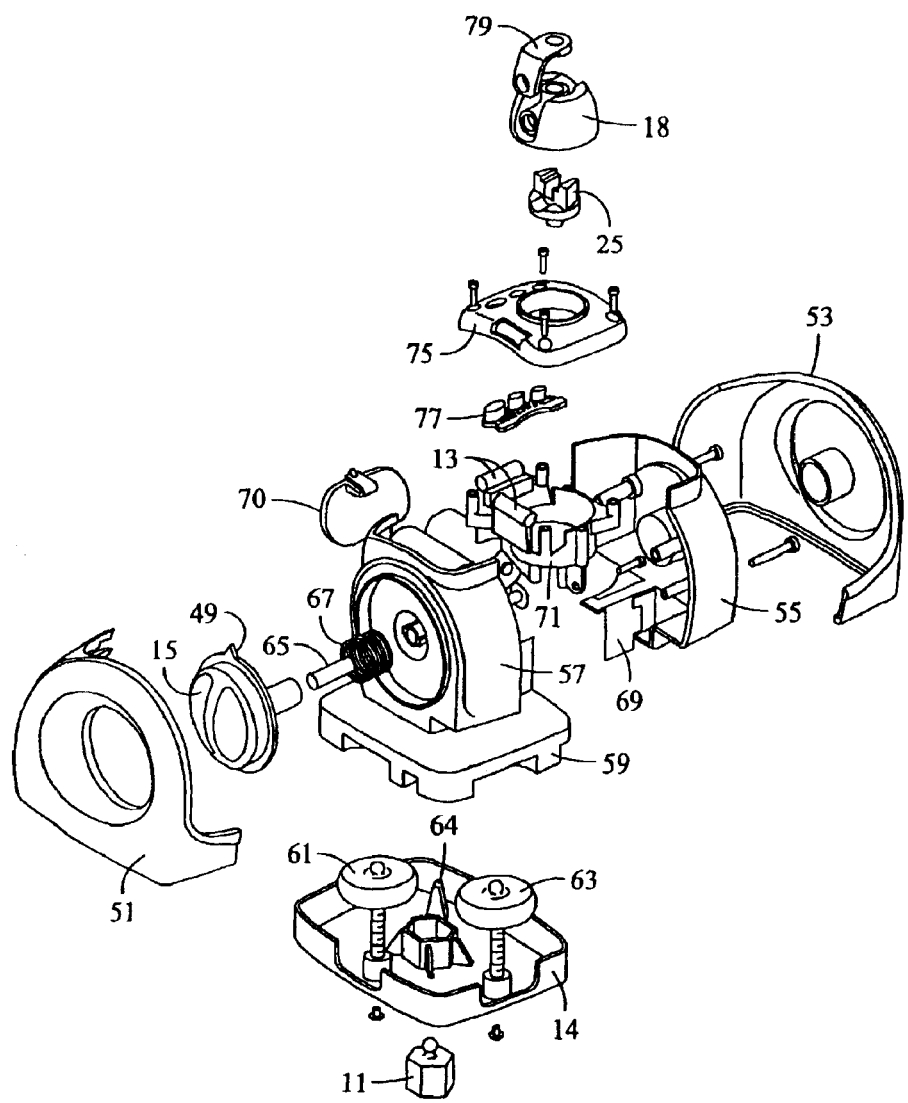
FIG. 3 is an exploded view of components used in the embodiment of FIG. 1.

FIG. 2 is an isometric view of the embodiment of FIG. 1 wherein the lens assembly 17 has been swiveled or pivoted to the right for generating laser light in a vertical plane. Visible in FIG. 2 is a second bubble level 13 and a second lens 19b in the lens cap 18 and lens assembly 17. All other numerals are the same as FIG. 1, including housing 12, base 14, and swivel or pivot knob 15, now turned to the right for the alternate laser light orientation. When the lens cover and lenses rotate in the direction of the arrow shown, light emerges from lens 19a in a vertical plane. Note also that with the second lens 19b (not visible in FIG. 1), light may emerge in a direction perpendicular to the light emerging from lens 19a. Thus, a user may locate or orient the laser line generator by selecting a height or a point on a nearby wall using the laser light from the secondary lens 19b. The secondary lens may be used in the orientation of FIG. 1 by locating or orienting the laser line generator with respect to a ceiling or other upper surface. The bubble levels include the two shown in FIG. 2 and may also include a third bubble level perpendicular to these two. An embodiment having three bubble levels is depicted in FIG. 3. One or more circular bubble levels may be used instead of the linear bubble levels depicted.

FIG. 3 is an exploded view of an embodiment of a rotating laser line generator depicting some, but for reasons of clarity, not all, parts of the rotating laser line generator. The lower base 14 may include a fitting 11 for a tripod, so that the generator may be quickly and easily mounted at a work site or within a room. The fitting 11 is preferably mounted flush with the bottom surface of lower base 14, so that the generator may be mounted on a flat surface, such as a table or a desk. Note that the generator may be mounted by a fitting on its bottom, but with its pivoting capability, is capable of generating either a vertical or horizontal beam of light. Lower base 14 mounts to upper base 59 to adjustably mount an inner housing frame composed of left inner housing 55 and right inner housing 57. Upper base 59 may snap fit into lower base 14 via on or more snap-fit features 64.

The pivot portion of the generator includes a pivoting knob 15 on a shaft 65 that mounts right inner housing 57 and left inner housing 55, which form a pivoting frame. There is also a spring 67 that provides a torsional load between the pivoting frame and housing 51, locking them together with a trilobal tab 49 and notches to match the tab, located inside right outer housing 51 at the top and right sides respectively. When a user wishes to change the light orientation from horizontal to vertical, the user pushes in the knob, depressing the spring and releasing trilobal tab 49 from a holding notch. The user then twists the knob to the right to change the laser light orientation to vertical, as shown in FIG. 2. When desired, the user may twist the knob to the left to change the laser light orientation back to horizontal.

Mounted within the inner housing portions 55, 57 of the frame is chassis 71. Chassis 71 is preferably die-cast, but may also be made by other convenient methods. The chassis or casting preferably defines mounts for securely mounting three mutually perpendicular bubble levels 13, a motor 22 (FIG. 4) for rotating the laser lens, and a printed-circuit board for controlling the rotating laser line generator. The batteries are provided with battery contacts 69 (only one visible in FIG. 3) to transmit battery power to the printed circuit board. The generator preferably has easy access to install or replace batteries through battery door 70.

The generator also includes controls 77, preferably including an on/off switch and switches for speeding up and slowing down the rotational speed of the motor that rotates the lenses. The lenses are mounted on head casting 25 and protected by head cover 18 and lens retainer 79. Lens retainer 79 is preferably made from a material transparent to the laser light transmitted by the lenses. Lens retainer 79 may snap-fit into head cover 18 to retain lenses 19a and 19b and restrain them from falling out when the laser light generator is rotating. Head cover 18 may snap-fit into top cover 75 for easy assembly and disassembly. Head casting 25 is preferably die-cast, but may be made by any other convenient method, such as machining. The head casting is mounted atop the motor 22 and itself mounts the mirrors 21a and 21b.

The rotating laser line generator also has a top cover 75 with areas for the bubble levels. Important to the functioning of the laser generator is that the lens be mounted correctly, whether in the vertical or horizontal orientation. Therefore, the rotating laser line generator is preferably equipped with manual leveling wheels 61, 63 on two mutually perpendicular axes of the generator. The leveling wheels allow an operator to fine-tune the orientation of the generator using the bubble levels. As will be seen below, the generator preferably also yields a beam of light perpendicular to the rotating beam. This beam of light will exit from the top of the laser generator and will be visible on a ceiling or top surface when the rotating beam is oriented horizontally. This auxiliary or secondary beam may be used to locate the generator, and may be used in conjunction with the bubble levels to orient the generator.

Figure 4:
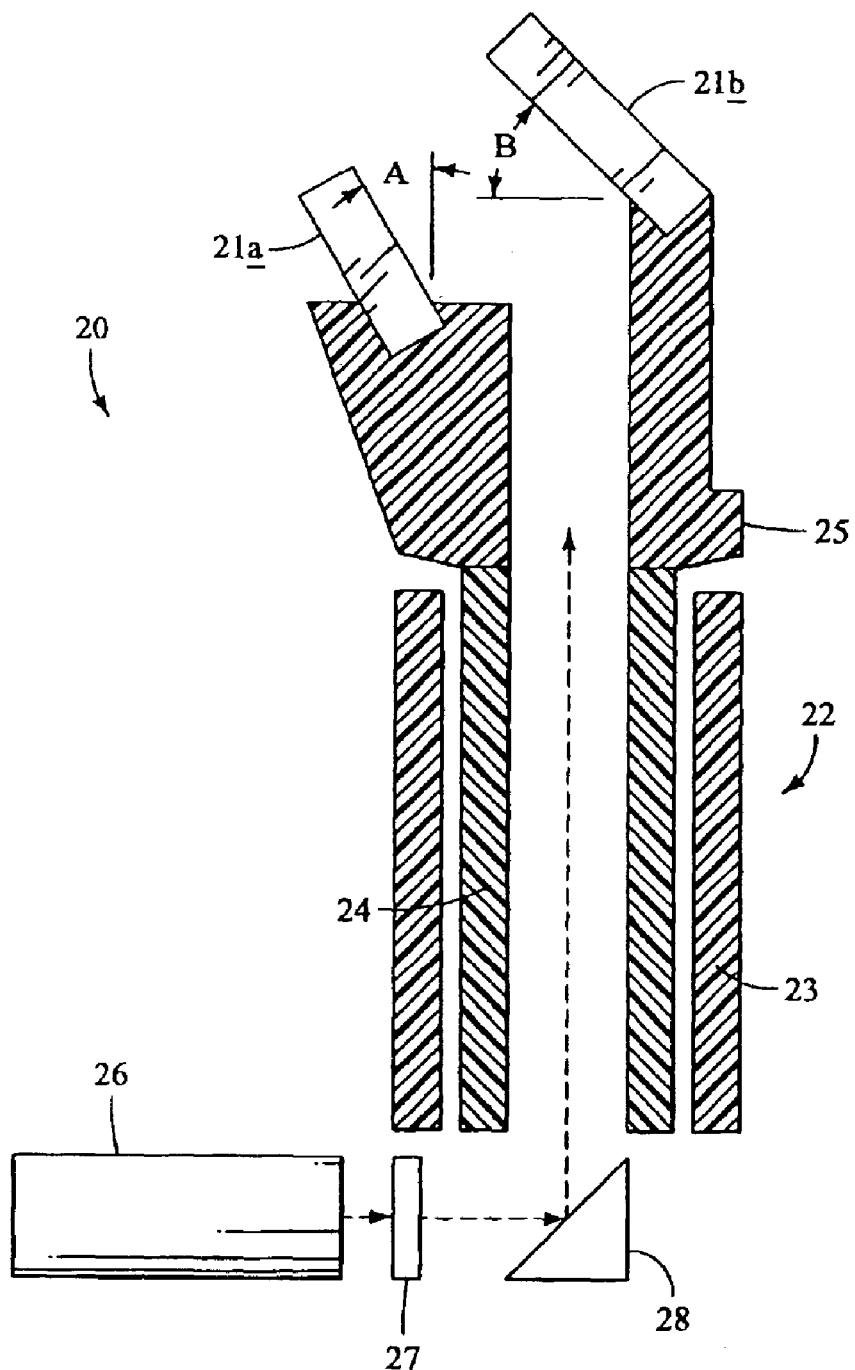
FIG. 4 is a partial cross section of the rotating portion of the embodiment of FIG. 1.

FIG. 4 depicts one embodiment of the working portion of the rotating laser line generator. Laser light is generated by a laser diode or other source of laser light, powered by a battery. One preferred laser diode is a 635 nm, class IIIa laser diode, having an output of less than 5 mW and drawing little power. The diode produces coherent laser light that may be focused by lens 27 and reflected by prism 28, prism 28 preferably having at least one mirrored surface on its back wall. The light is reflected as shown in FIG. 4, traveling until it reaches mirror 21b. In this embodiment, the laser light passes through a pathway in the center of motor 22, including stator portion 23 and rotating hollow shaft 24. Head casting 25 is only partially shown in order that more detail concerning the mounting may be viewed. Head casting 25 mounts mirrors 21a and 21b and is mounted to the shaft 24 by any convenient means, such as brazing or welding. Fasteners may also be used for easy disassembly and maintenance, so long as steps are taken to insure that the shaft and the casting are aligned, so that the rotating laser light will maintain a level orientation.

Mirror 21a is in position to receive light reflected from mirror 21b and to transmit the reflected light through lens 19a. In one embodiment, mirrors 21a and 21b are made from float glass and are about 1.5 mm thick (0.038 inches thick). In some embodiments, the opposing faces of mirrors 21a and 21b are parallel, and preferably maintained within 10 arc-seconds of parallelism. Mirror 21a is preferably oriented at about 45° from vertical, as indicated by arrow A and mirror 21b is also preferably oriented at about 45° from horizontal, as indicated by arrow B. In a highly preferred embodiment, mirrors 21a and 21b are oriented at about 45°±0.05 degrees from horizontal. A rotating laser line generator with these features maybe used indoors at distances of up to 200 ft (200 ft diameter) and may be used outdoors for a distance of up to 800 ft when used with a laser detector. The accuracy of the embodiments is about 6.5 mm (0.25 inches) at about 100 ft. Mirror 21*a* reflects virtually all light incident upon it, while mirror 21*b* is only partially reflective, allowing about 25% of the light incident upon mirror 21*b* to transmit through the mirror, while the remainder is reflected to mirror 21*a*.

Figure 5:
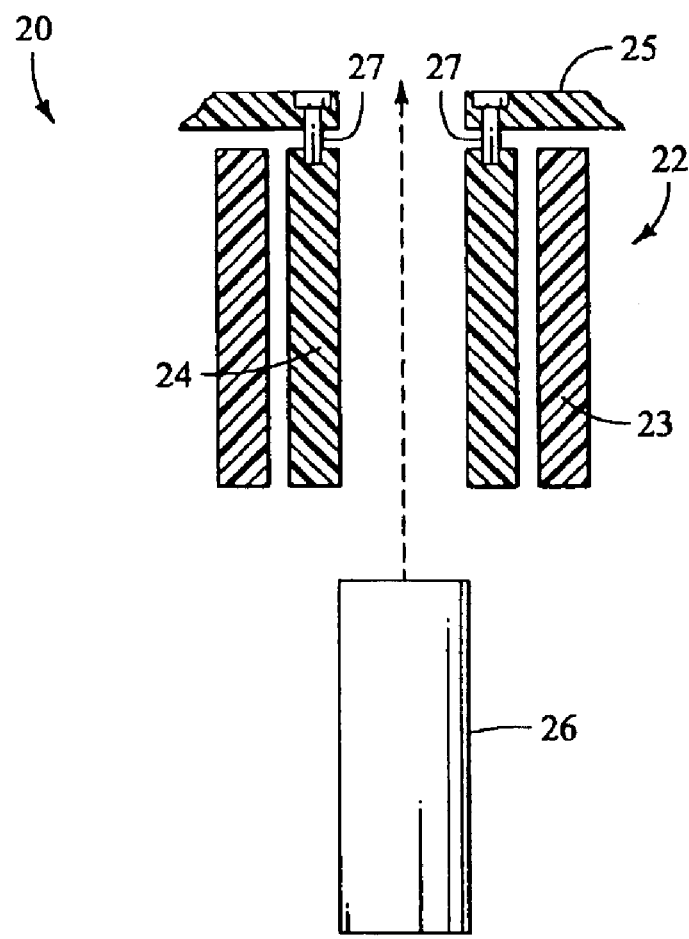
FIG. 5 is an alternate cross sectional view of a rotating portion of a rotating laser light generator.

An alternate embodiment of a rotating laser line generator 20 is depicted in FIG. 5. Laser diode 26 generates laser light that is transmitted through motor shaft 24. Motor 22 mounts head casting 25, not directly but with an adapter 27, which may be any convenient shape or material. In this embodiment, the laser light path is also through the center of the shaft 24 and motor 22.

Figure 6:
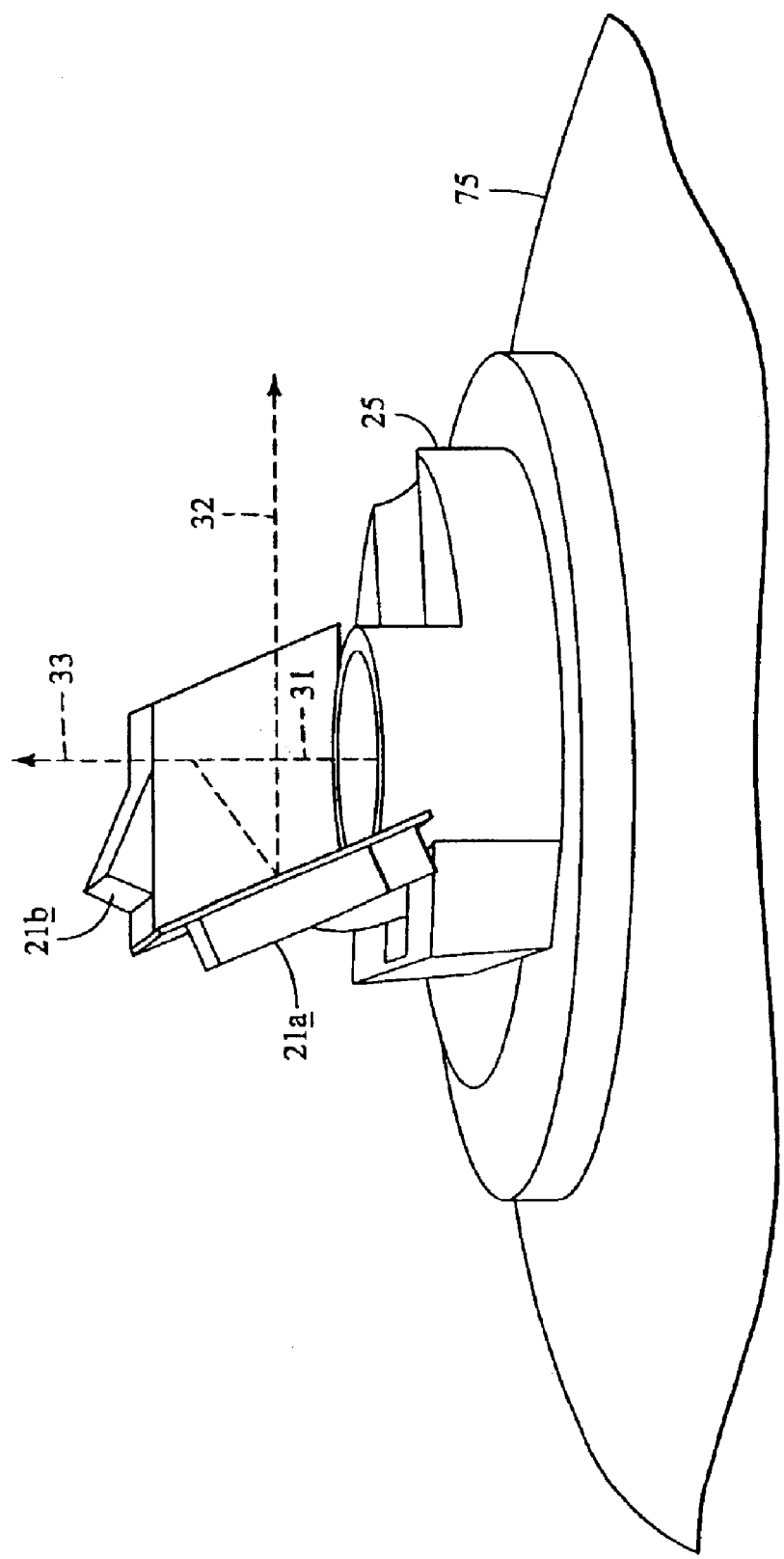
FIG. 6 is a side elevational view of the embodiment of FIG. 1.
Figure 7:
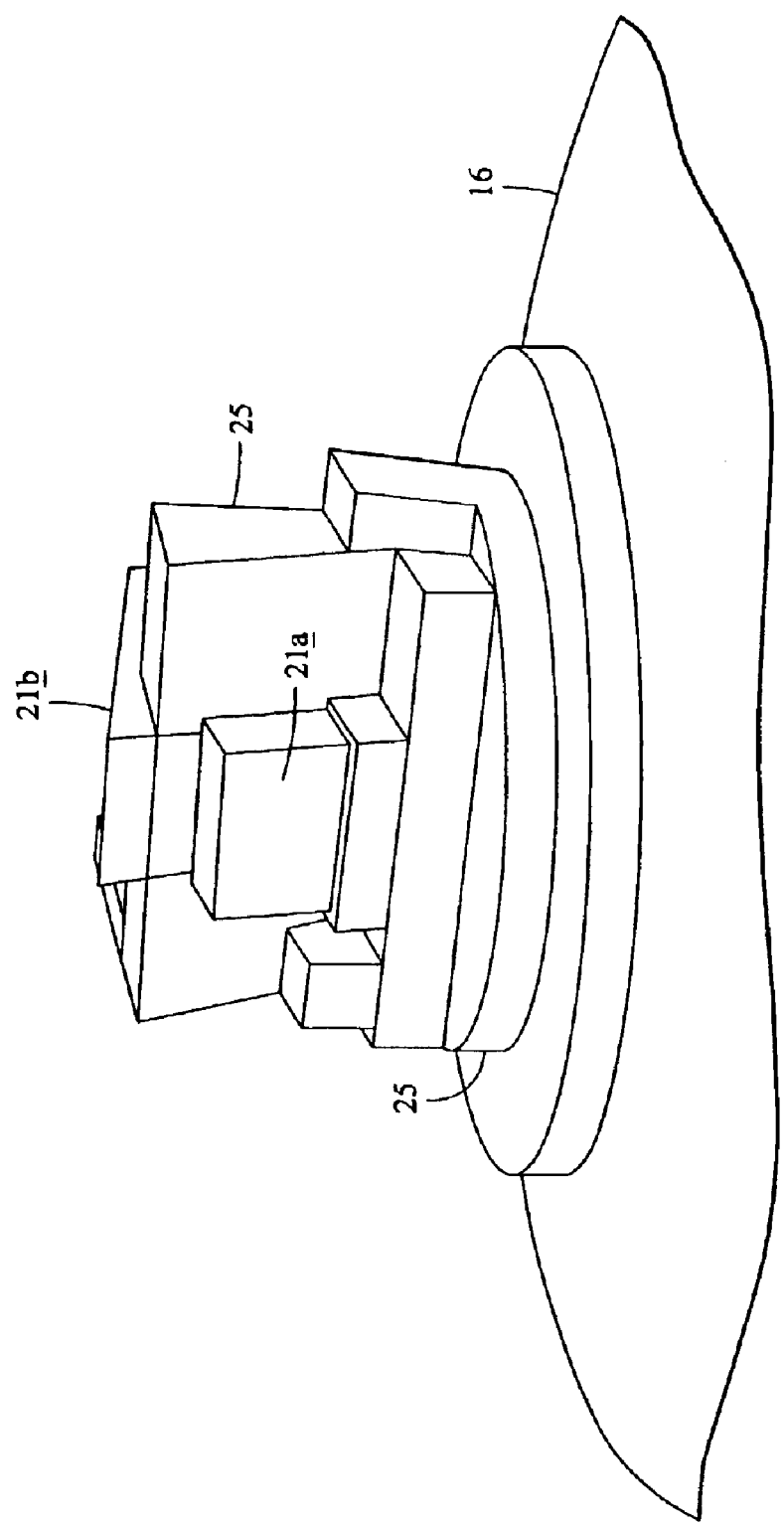
FIG. 7 is an alternate view of the embodiment of FIG. 6.

FIG. 6 depicts an embodiment of the laser line generator and one method of the functioning of the mirrors 21*a* and 21*b*. Mirrors 21*a* and 21*b* are mounted on head casting 25 protected by cover 75. Note that in this view lens cover 18 has been removed for clarity. Laser light enters from the bottom of the figure and is transmitted through mirror 21*b*, as indicated by straight light path 31 and transmitted light path 33. In one embodiment, the mirror 21*b* passes about 25% of the incident light directly through in this manner. The majority of the light, about 75%, follows path 32 and is reflected from mirror 21*b* and re-reflected from mirror 21*a*, exiting along path 32, and perpendicular to straight light path 31. As the head casting and mirrors rotate, a laser light beam exiting along path 32 will travel a 360° horizontal path for aligning objects vertically, and laser light following path 33 will be visible on a ceiling for locating the laser light generator. FIG. 7 is an exposed front perspective view of the rotating mirrors, head casting 25 and cover 16. Mirror 21*a* is secured by details of head casting 25, as is top mirror 21*b*. As in FIG. 6, the cover has been removed so that details of the mirrors and head casting are visible.

Figure 8:
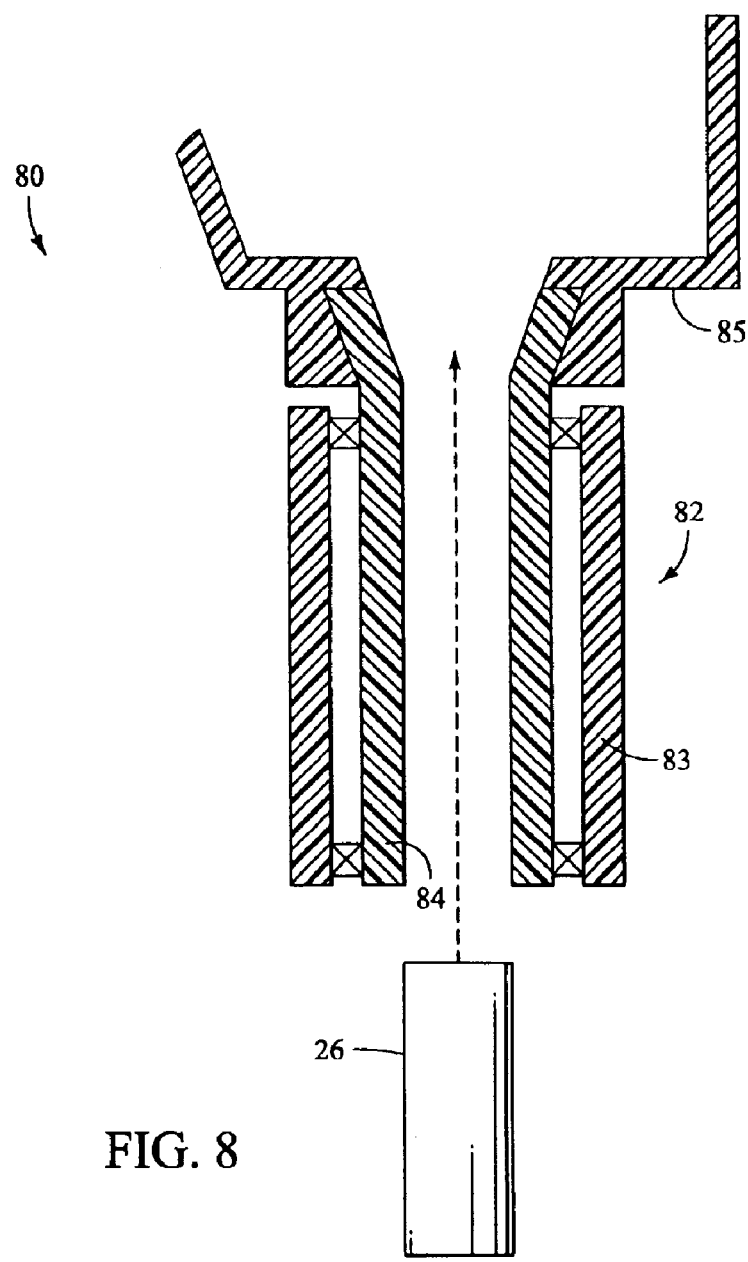
FIG. 8 is an alternate embodiment of a laser light generator.

FIG. 8 presents a elevation view in partial cross section of an alternate embodiment of a rotating laser line generator 80 in which the laser light source 26 is arranged in parallel with the motor 82 and stator 83. The laser light from source 26 is directed to a path through the center of motor shaft 84 and head casting 85. Shaft 84 and head casting 85 may be assembled permanently or in a manner allowing for disassembly. Permanent means may include brazing or soldering the head casting 85 to the shaft. Other means may include pinning or the use of an interference fit between the shaft and the casting. Means of assembly that may be easily removed, such as fasteners or keyways between the shaft and the casting, may also be suitable.

Figure 9:
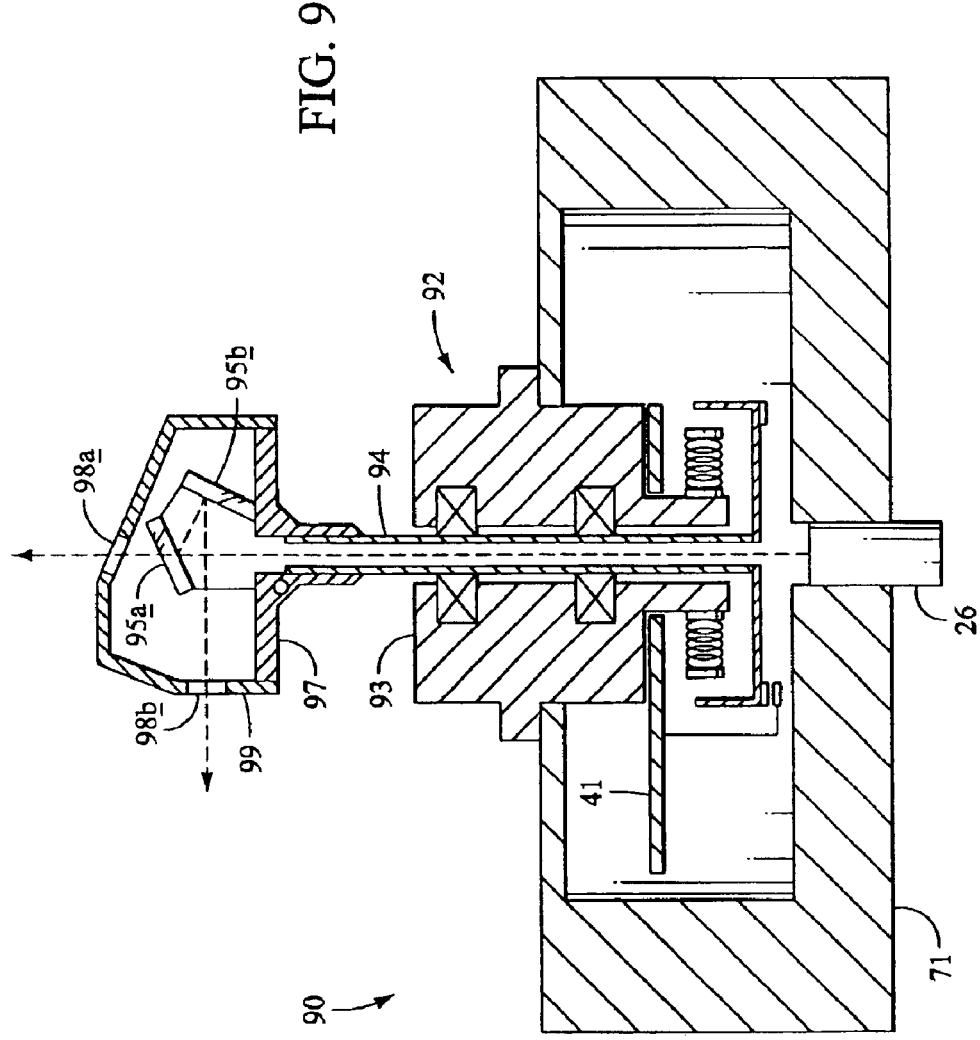
FIG. 9 is another alternate embodiment of a laser light generator.

FIG. 9 depicts a partial elevational view of another embodiment of a rotating laser line generator 90. Chassis 71 mounts laser light source 26, a printed circuit board 41, and a brushless DC motor 92. The chassis may mount stator 93 directly while motor shaft 94 may be supported on bearings for rotation. Shaft 94 mounts head casting 97 for rotation of mirrors 95*a* and 95*b*, which are mounted on head casting 97, and for rotation of lens cover 99, which mounts output lenses 98*a* and 98*b*. Laser light from the laser light source 26 travels through the center of shaft 94 and impinges on mirror 95*a*. In this embodiment, about 25% of the light is transmitted through mirror 95*a* and lens 98*a* in lens cover 99. The remainder of the light is reflected from mirror 95*a* to mirror 95*b*, and then reflected through lens 98*b*. The light exiting lens 98*b* is perpendicular to the light exiting lens 98*a*. In one embodiment, lens 98*a* is oriented at about 22.5 degrees from horizontal, and lens 98*b* is oriented vertically, at about 90° from horizontal, as shown. The orientation of lens 98*b* is not as important as the orientation of lens 98*a* and the mirrors. The faces of lenses 98*a* and 98*b* are preferably kept flat and parallel to each other. Preferably, the faces of each lens are kept parallel to within 10 arc-seconds of an angle.

As shaft 94 rotates, the head casting 97, mirrors 95*a* and 95*b*, and cover 99 also rotate. In the orientation shown, light transmitted through output lens 98*a* may impinge on a ceiling or upper surface as a dot. Light transmitted through output lens 98*b* will appear as a horizontal rotating beam on the walls or other surfaces of a room or enclosure in which it is used. Using the pivoting mechanism discussed above, the entire rotating laser line generator 90 as depicted in FIG. 9 may be pivoted 90°. Light transmitted through lens 98*a* would then appear as a dot on a wall in the room, while light transmitted through lens 98*b* would appear as a vertical rotating beam, and the laser light would then impinge on the ceiling, the walls and the floor as the head casting and lenses rotate. In one embodiment, lenses 98*a* and 98*b* are about 2 mm thick (about 0.078 inches) and are about 11 mm in diameter (0.43 inches in diameter).

Figure 10:
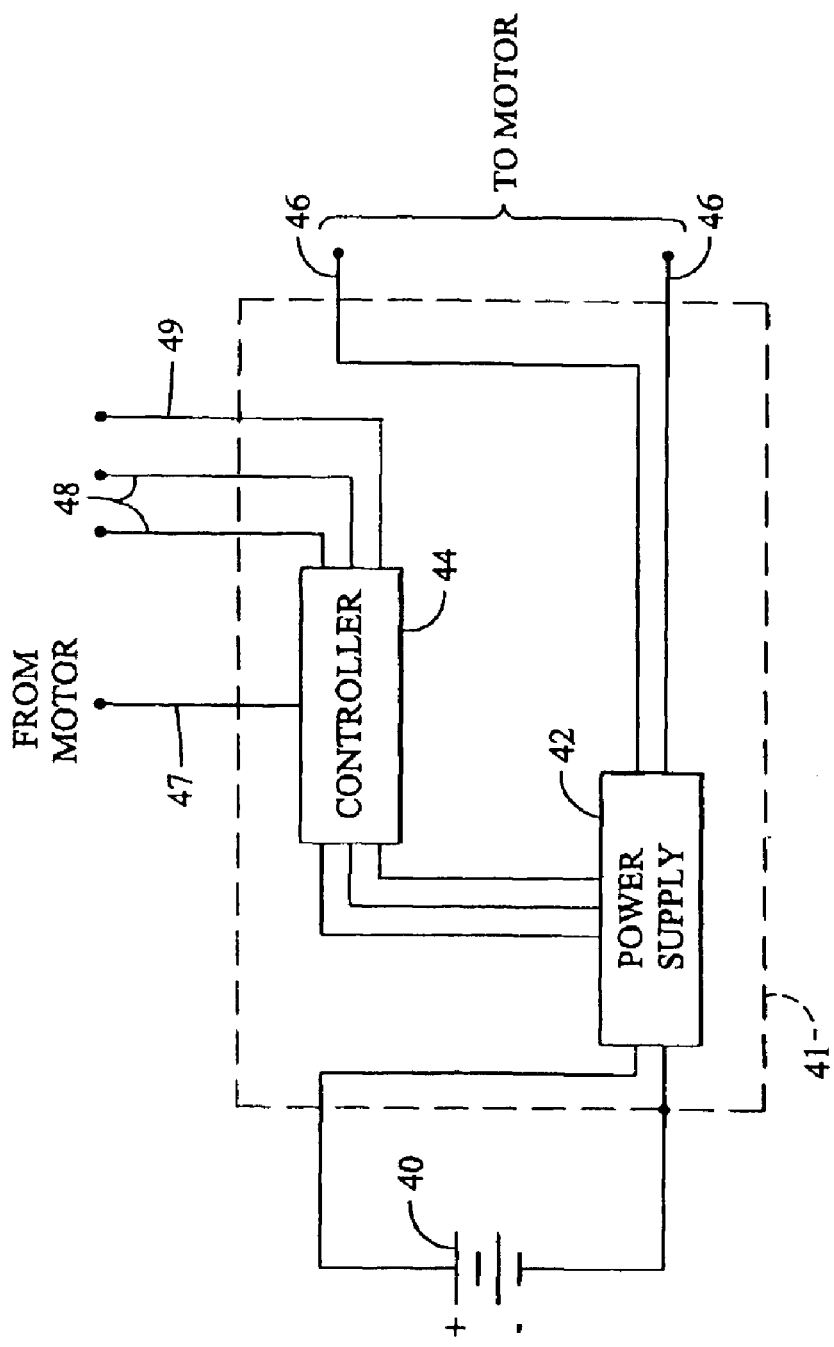
FIG. 10 depicts an embodiment of the controls for the rotating laser line generator.

FIG. 10 depicts an embodiment of a control schematic for the rotating laser line generator. The control scheme may include one or more batteries 40, such as C cell batteries connected to a power supply 42 mounted on circuit board 41. The circuit board is preferably small, and may be traditional FR4 or other fiberglass material, or may alternately be printed on flex-print or other convenient medium. The control circuit preferably includes controller 44, receiving encoder signals or other indication of motor speed via trace 47 from motor shaft 24. Inputs to the controller 44 preferably include traces for an on/off circuit 49 and speed up/slow down signals 48. Switches or other controls for speed up/slow down and on/off may be the three buttons indicated in FIG. 3. The power supply may include a potentiometer adjusted by the controller and sending a variable DC output voltage to motor connect terminals 46 for controlling a speed of the motor. The motor 22 preferably includes an encoder on the shaft 24 or other means for indicating a speed of the shaft. While an encoder may be a preferable means for indicating shaft speed, other methods may also be used, such as a magnetic pick-up or Hall-effect sensor mounted near the motor shaft. In one embodiment, the controller controls the speed of the shaft rotation from 0 rpm to about 600 rpm.

While this invention has been shown and described in connection with the preferred embodiments, it is apparent that certain changes and modifications, in addition to those mentioned above, may be made from the basic features of this invention. For instance, while the preferred embodiment may conserve space by beaming the laser light through the motor that rotates a lens, other embodiments may route the light through other paths.

In other embodiments of a laser generating device, alignment may be made in lines or planes that are diagonal, rather than horizontal or vertical. While the laser line generator may be most convenient to use when mounted on a tripod, it may also be mounted on a table, floor, or other flat surface, and used to project a rotating laser line. Many other variations of our invention may also be used without departing from the principles outlined above. Accordingly, it is the intention of the applicants to protect all variations and modifications within the valid scope of the present invention. It is intended that the invention be defined by the following claims, including all equivalents.

What is claimed is:

1. A rotating laser line generator, comprising:

a housing having at least one mounting feature;

a laser light source, at least one mirror receiving and transmitting the laser light, and a motor rotating the at least one mirror, so that the transmitted light rotates, and wherein the laser light is transmitted from the light source through a center of the motor to the at least one mirror; and a controller connected to the motor to control a speed of the motor, wherein the laser light source emits light at constant power whether the light is rotating or still.

2. The generator of claim 1, further comprising a pivot, wherein a user pivots a portion of the laser line generator to change a direction of the laser light.

3. The generator of claim 1, wherein the motor is oriented in a direction parallel to an axis of rotation of the laser light.

4. The generator of claim 1, further comprising a lens for transmitting a portion of the light in a direction perpendicular to an axis of rotation of the laser light.

5. The generator of claim 1, wherein the power supply is a battery mounted within the housing and switchably connected to the laser light source.

6. The generator of claim 1, further comprising at least one bubble level and manual means for adjusting the rotating laser line generator.

7. The generator of claim 1, further comprising the bubble levels oriented at right angles to each other and manual means for adjusting the bubble levels.

8. The generator of claim 1, further comprising a second mount for mounting at least one lens, the second mount mounted to the motor.

9. The generator of claim 1, further comprising a controller for controlling a speed of the motor.

10. The generator of claim 9, further comprising a circuit board mounted to the first mount, said circuit board mounting a power supply and the controller for the motor.

11. The generator of claim 1, further comprising an encoder for the motor.

12. The generator of claim 1, wherein the center of the motor comprises a shaft, and the laser light is transmitted through a center of the shaft.

13. A rotating laser line generator, comprising:

a housing having at least one mounting feature and a pivot;

a laser light source mounted to a chassis within the housing;

a motor mounted to the chassis;

a head casting rotatably mounted to the motor; and at least one mirror mounted to the head casting and adapted to receive light from the laser light source and project light from said light source, wherein the laser light source projects light through a path in the motor to the at least one mirror, and the motor rotates the head casting and the at least one mirror.

14. The rotating laser line generator of claim 13, further comprising at least one bubble level and manual means for adjusting the at least one bubble level.

15. The rotating laser line generator of claim 13, further comprising at least one battery switchably connected to the motor and laser light source.

16. The rotating laser line generator of claim 13, further comprising a controller and an encoder for controlling a speed of the motor.

17. A rotating laser line generator, comprising:

a housing;

a laser light source mounted within the housing;

at least one mirror adapted to receive light from the source and project said light in a first direction and in a second direction of propagation; and a power supply and motor connected to the at last one mirror, wherein the light travels a path through a center of the motor and the laser light source, the motor and the at least one mirror are mounted pivotally within the housing.

18. The rotating laser line generator of claim 17, wherein the first and second directions of propagation are perpendicular.

19. The rotating laser line generator of claim 17, further comprising a controller controllably connected to the power supply and motor for controlling a speed of the motor.

20. A method for projecting laser light, the method comprising:

providing a rotating laser line generator;

projecting laser light through a center of a motor rotating at least one mirror; and rotating the at least one mirror to project a first laser light beam onto a first surface and to project a second laser light beam perpendicular to the first light beam onto a second surface perpendicular to the first surface.

21. The method of claim 20 further comprising pivoting the at least one mirror 90°.

22. The method of claim 20 further comprising leveling the laser line generator with at least one manual means for adjusting at least one level indicator.

23. The method of claim 20 further comprising controlling a speed of the motor.

24. A rotating laser line generator, comprising:

a housing;

a laser light source and power source mounted within the housing;

at least one mirror for receiving and transmitting the laser light; and a motor for rotating the at least one mirror, wherein the laser light source projects a laser light through a center of the motor, the mirror splits the light into two portions, and the motor rotates the at least one mirror to project a rotating laser light, the laser light source emitting light at constant power whether the laser light is rotating or still.

25. The rotating laser light generator of claim 24, further comprising a controller for controlling a speed of the motor.

26. The rotating laser light generator of claim 24, further comprising a pivot mechanism to rotate the at least one mirror, the motor and the laser light source 90°.

27. The rotating laser light generator of claim 24, further comprising at least one level indicator and at least one means for manually adjusting a level of the rotating laser light generator.

28. The rotating laser light generator of claim 24, wherein a first mirror is oriented at 45° from a laser light source and a second mirror is oriented at about 45° from a source of reflected laser light.

29. A method for projecting laser light, the method comprising:

manually aligning a laser light generator;

projecting and rotating a laser light generated by the laser light generator in a horizontal orientation;

pivoting a portion of the laser light generator; and projecting and rotating the laser light in a horizontal orientation wherein the laser light is rotated by a motor and the laser light shines through a center of the motor.

30. The method of claim 29, further comprising manually aligning the laser light generator after the step of pivoting the laser light generator.

* * * * *

UNITED STATES PATENT AND TRADEMARK OFFICE
CERTIFICATE OF CORRECTION

PATENT NO. : 6,871,408 B2
DATED : March 29, 2005
INVENTOR(S) : Fabrice Malard et al.

It is certified that error appears in the above-identified patent and that said Letters Patent is hereby corrected as shown below:

Column 7,
Line 66, delete "last" and insert -- least --.

Signed and Sealed this

Seventh Day of February, 2006

JON W. DUDAS
*Director of the United States Patent and Trademark Office*